United States Patent
Donce

(10) Patent No.: US 8,829,416 B2
(45) Date of Patent: Sep. 9, 2014

(54) PASSIVE MECHANICAL ATHERMALIZATION DEVICE, AND RELATED OPTICAL SYSTEM

(75) Inventor: Lucien Donce, Paris (FR)

(73) Assignee: Sagem Defense Securite, Paris (FR)

( * ) Notice: Subject to any disclaimer, the term of this patent is extended or adjusted under 35 U.S.C. 154(b) by 54 days.

(21) Appl. No.: 13/813,149

(22) PCT Filed: Jul. 12, 2011

(86) PCT No.: PCT/EP2011/061874
§ 371 (c)(1),
(2), (4) Date: Jan. 29, 2013

(87) PCT Pub. No.: WO2012/013491
PCT Pub. Date: Feb. 2, 2012

(65) Prior Publication Data
US 2013/0126717 A1    May 23, 2013

(30) Foreign Application Priority Data
Jul. 30, 2010    (FR) ...................................... 10 56342

(51) Int. Cl.
*G02B 7/02* (2006.01)
*G01J 1/02* (2006.01)

(52) U.S. Cl.
CPC *G02B 7/02* (2013.01); *G02B 7/028* (2013.01); *G01J 1/0271* (2013.01)
USPC .......................................... 250/216; 359/820

(58) Field of Classification Search
USPC ...................... 250/216, 221, 237 R, 238, 239; 359/355, 819, 820, 822, 823
See application file for complete search history.

(56) References Cited

U.S. PATENT DOCUMENTS

| | | | |
|---|---|---|---|
| 5,202,792 A * | 4/1993 | Rollin | ........................... 359/356 |
| 5,210,650 A | 5/1993 | O'Brien et al. | |
| 5,313,333 A * | 5/1994 | O'Brien et al. | ................ 359/820 |
| 6,188,841 B1 | 2/2001 | Kamata | |
| 6,631,040 B1 | 10/2003 | Cox | |
| 6,650,412 B1 | 11/2003 | Slater | |
| 2010/0165492 A1 | 7/2010 | Kimura | |

FOREIGN PATENT DOCUMENTS

| DE | 102006060088 A1 | 6/2008 |
|---|---|---|
| EP | 1014139 A2 | 6/2000 |
| EP | 1172676 A2 | 1/2002 |

* cited by examiner

*Primary Examiner* — Kevin Pyo
(74) *Attorney, Agent, or Firm* — Blakely Sokoloff Taylor & Zafman

(57) ABSTRACT

The invention relates to a passive mechanical athermalization device, comprising: a barrel (1) that is made of a first material having a first thermal expansion coefficient (11) and that has a longitudinal axis (AA), said barrel comprising at least one first portion (11) and at least one second portion (12), the device being characterized in that it comprises: at least three beams (7) made of the first material, each of the beams (7) circumferentially connecting the first portion (11) and the second portion (12) relative to the longitudinal axis (AA); at least three bars (8) made of a second material having a second thermal expansion coefficient (12) that is different from the first thermal expansion coefficient, circumferentially distributed around the barrel (1) relative to the longitudinal axis (AA), each bar (8) axially connecting the first portion (11) and the second portion (12) relative to the longitudinal axis (AA) such that the thermal expansion of the barrel (1) results in a deformation of the beams (7) and of the bars (8) along the longitudinal axis (AA). The invention also relates to an optical system comprising such a passive athermalization device.

10 Claims, 3 Drawing Sheets

PASSIVE MECHANICAL ATHERMALIZATION DEVICE, AND RELATED OPTICAL SYSTEM

GENERAL TECHNICAL FIELD

Figure 1:
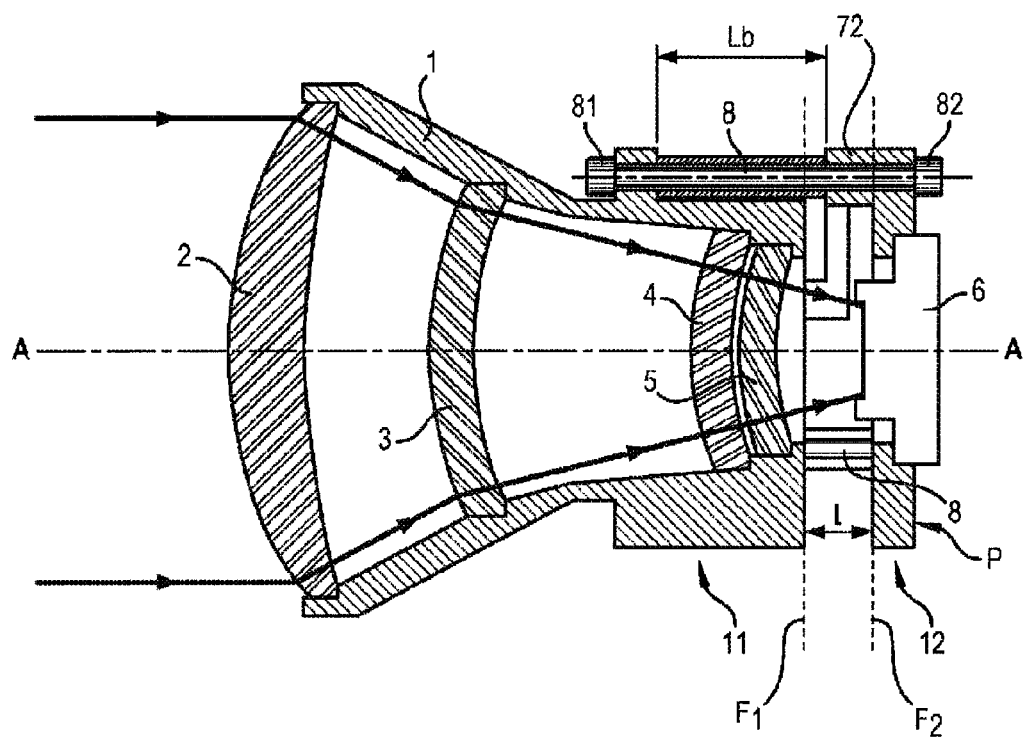

The invention concerns a passive mechanical athermalization device comprising a barrel formed of a first material having a first thermal expansion coefficient and having a longitudinal axis comprising at least one first portion and at least one second portion.

The invention also concerns an optical system comprising said passive athermalization device.

STATE OF THE ART

All infrared optical systems, in particular in self-guiding devices and binoculars, must guarantee stable performance in harsh environments and notably with regards to temperature.

Yet the optical materials used for infrared such as germanium create thermal defocusing via strong changes in refractive index when the temperature varies.

Passive optical athermalization devices exist and generally use at least three different optical materials (e.g. Ge, ZnSe, AsGa) to compensate for optical defocusing.

The supporting structures for lenses in optical materials, generally in aluminium, also cause defocusing when the temperature varies. Defocusing may be of the order of 100 to 300 µm for a temperature variation of 85° C.

Mechanical passive athermalization devices also exist which generally use at least two different materials (e.g. invar and aluminium), to compensate for mechanical defocusing.

Mechanical athermalization devices of infrared optical systems are generally composed of two sub-assemblies.

The first sub-assembly carries the optical lenses formed of optical materials, and the second sub-assembly carries the infrared sensor of the infrared optical system.

These two sub-assemblies are connected via a connecting part whose geometric definition and material are chosen to compensate for defocusing subsequent to relative movement of the two sub-assemblies, pro rata to the differences in expansion coefficients of the materials.

This type of architecture requires most precise fabrication of the parts to guarantee the quality of optical images.

In addition, mounting clearances for the sub-assemblies lead to alignment errors particularly as regards coaxiality and perpendicularity. Manufacturing costs to obtain the required precision of the systems soon become very high.

The bulk of the connecting part is of the same order of magnitude as that of the two sub-assemblies, which leads to substantial overall volume.

U.S. Pat. No. 5,210,650 discloses a device according to the preamble of claim 1.

U.S. Pat. No. 6,650,412 discloses a thermal compensation device for optical equipment.

PRESENTATION OF THE INVENTION

The invention proposes overcoming at least one of these disadvantages.

For this purpose, a device according to claim 1 is proposed by the invention.

The invention is advantageously completed by the characteristics of the dependent claims taken alone or in any technically possible combination thereof.

The invention also concerns an optical system comprising said passive athermalization device.

The invention offers numerous advantages.

Since the first portion and the second portion are connected by beams circumferentially to the longitudinal axis of the barrel, only very few precise assembly operations are required.

In the very advantageous case in which the first portion, the second portion and the at least three beams are in a single piece, no precise assembling is necessary. Therefore all the positions of the lenses, of the detector and of the beams are obtained on the barrel, which provides a reduction in manufacturing costs.

At all events, the precision locating of the lenses and of the detector is more easily verified than in the prior art.

The optical system is more compact, and its integration into platforms oscillating along two axes is facilitated on account of lighter weight and smaller inertia.

The bars take up little space and only require limited precision at the time of manufacture since they only ensure the function of controlled thermal expansion. The longer their length the more the precision of manufacture can be reduced: tolerance regarding their length has little influence on the variation in length when there is a variation in temperature.

The invention additionally allows fine-tuned adjusting of an angle between a plane containing a detector and the longitudinal axis of the barrel.

PRESENTATION OF THE FIGURES

Figure 2:
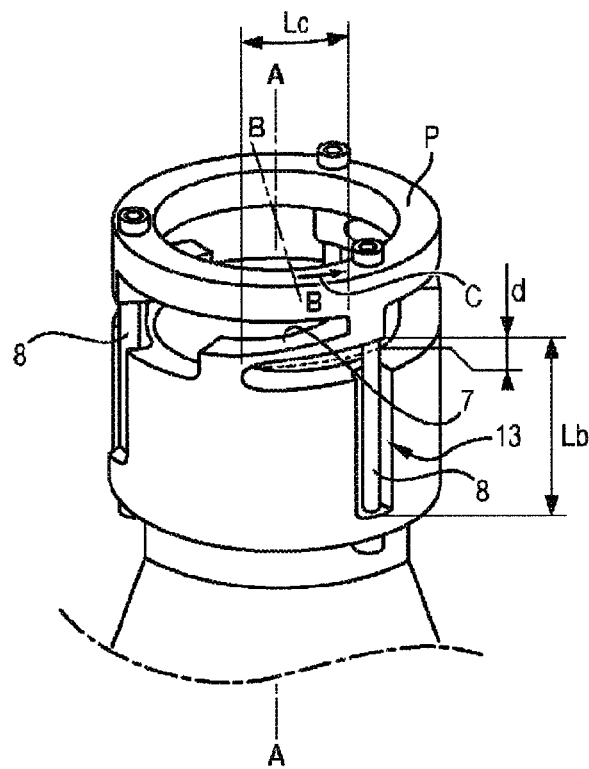
Figure 3:
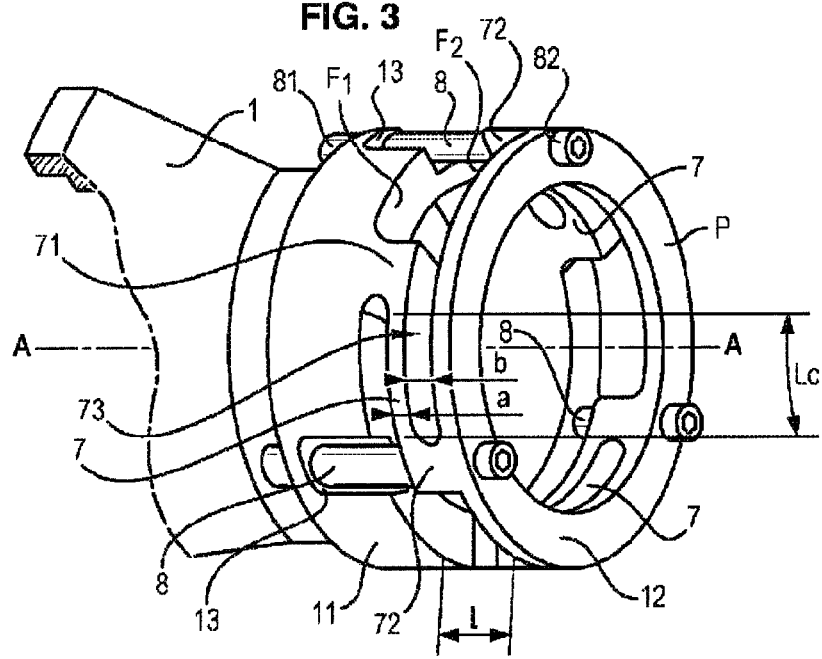
Figure 4:
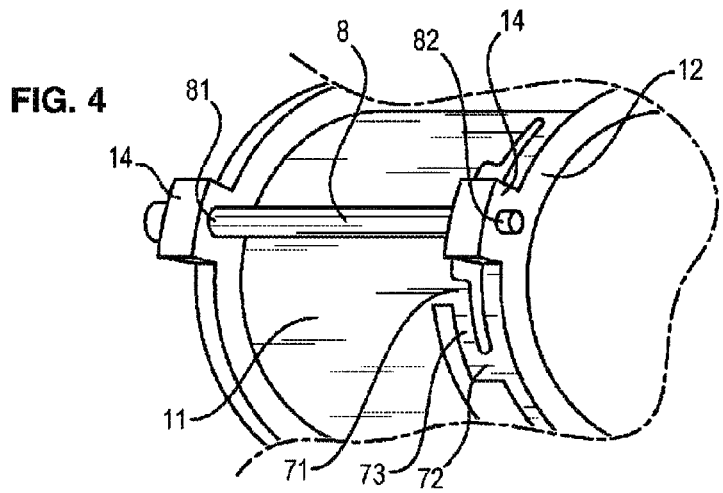
Figure 5:
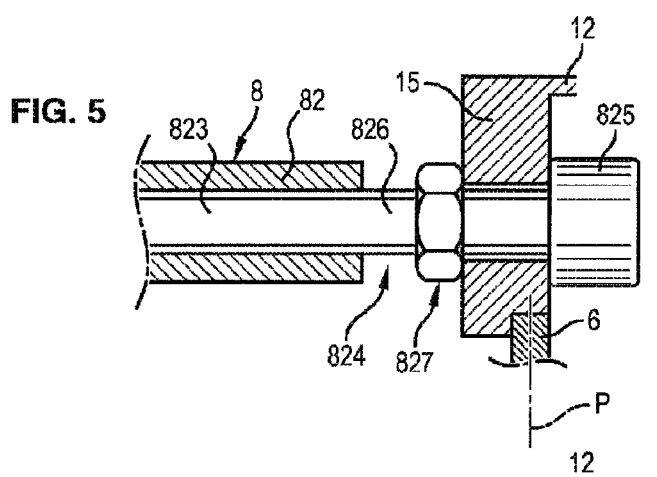
Figure 6:
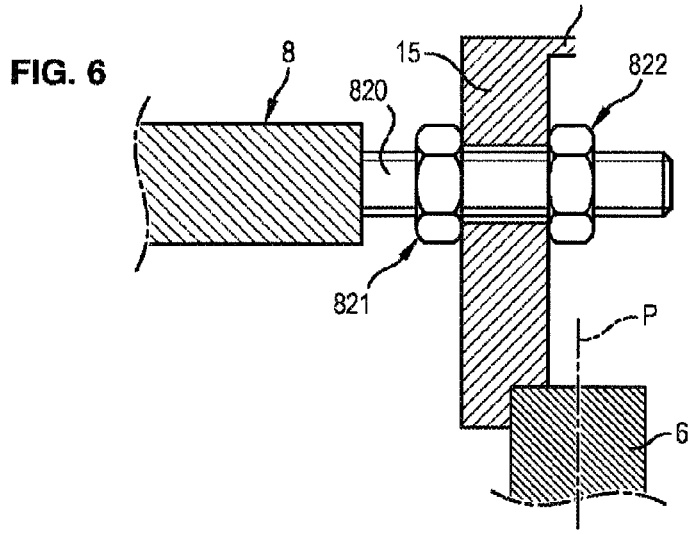

Other characteristics, objectives and advantages of the invention will become apparent from the following description which is solely illustrative and non-limiting, and is to be read in connection with the appended drawings in which:

FIGS. 1 to 3 schematically illustrate one possible embodiment of a device according to the invention;

FIG. 4 schematically illustrates another possible embodiment of a device according to the invention;

FIGS. 5 and 6 schematically illustrate means for adjusting an angle between a plane of a second portion of the barrel and the longitudinal axis of the barrel.

In all the Figures, similar elements carry identical reference numbers.

DETAILED DESCRIPTION

As shown in FIGS. 1 to 4, a passive mechanical athermalization device according to the invention chiefly comprises a barrel 1, at least three beams 7 and at least three bars 8.

The barrel 1 is formed of a first material having a first thermal expansion coefficient $\lambda 1$ and having a longitudinal axis (AA).

The first material is aluminium for example. Its thermal expansion coefficient $\lambda 1$ is therefore $23.8 \times 10^{-6}$.

The barrel 1 comprises at least one first portion 11 and at least one second portion 12. Advantageously, the barrel 1 is of general cylindrical shape.

The first portion 11 is advantageously, but not limited thereto, part of a support for an optical device 10 comprising a plurality of lenses referenced 2, 3, 4 and 5 formed of an optical material.

The lenses 2, 3, 4 and 5 may be in infrared optical material e.g. Ge, ZnSe, AsGa, and the optical detector 6 may be an infrared detector.

The second portion 12 may be, but is not limited thereto, part of a support for an optical detector 6 in the visible or infrared range.

The barrel may also comprise n stacks of pairs of portions 11 and 12, the first portion 11 of the stack of row n being the second portion 12 of the stack n+1 for example.

The at least three beams 7 are also formed of the first material. The beams 7 can be added onto the first portion 11 and second portion 12 (by welding for example) but most preferably the beams 7 are made in one piece on the first portion 11 and the second portion 12: the first portion 11, the second portion 12 and the at least three beams 7 are therefore in one block.

Each of the beams 7 connects the first portion 11 and the second portion 12, extending circumferentially relative to the longitudinal axis (AA). In the remainder of the present description, by "circumferentially" in a direction C is meant both:
 perpendicular to the longitudinal axis (AA), and
 perpendicularly to an axis (BB) radial to the barrel 1, perpendicular to the longitudinal axis (AA).

In other words, if the first portion 11 forms a cylinder centred around axis (AA) and having a face F1, and if the second portion 12 forms a cylinder centred around axis (AA) and having a face F2, each beam 7 connects the first portion 11 and the second portion 12 by forming an S whose ends are respectively connected to the first portion 11 and to the second portion 12.

As shown in FIGS. 2 and 3, there is a space between the beam 7 and the faces F1 and F2.

For example, the central portion of the beam 7 that is S-shaped is substantially parallel to the faces F1 and F2. Therefore, starting from Face F1 of the first portion 11, each beam 7 comprises an elbow 71 extending parallel to the axis (AA), then a central portion 73 extending parallel to face F1, then an elbow 72 extending parallel to axis (AA) to join up with face F2 of the cylinder of the second portion 12.

As shown in FIG. 3, the central portion 73 has a curvilinear length referenced Lc, and a straight section, e.g. rectangular of surface a×b.

As for the at least three bars 8, these are formed of a second material having a second thermal expansion coefficient $\lambda 2$, different from the first thermal expansion coefficient $\lambda 1$.

As shown in FIGS. 2 and 3, the bars 8 are separate from each other.

Advantageously:

$$\lambda 1 > \lambda 2$$

The second material is steel for example. Its thermal expansion coefficient $\lambda 2$ is therefore $12.0 \times 10^{-6}$.

The bars 8 are distributed circumferentially around the barrel 1 relative to the longitudinal axis (AA).

Each bar 8 connects the first portion 11 and the second portion 12 axially relative to the longitudinal axis (AA).

For this purpose, ends 81 and 82 of the bars 8 are respectively secured to the first portion 11 and to the second portion 12 via conventional means, such as screwing, crimping or bonding.

As shown in FIG. 1, each bar 8 has a length referenced Lb between the first portion 11 and the second portion 12, and a straight section e.g. hexagonal of surface S8.

To determine the relative displacement of the first portion 11 and the second portion 12, necessary for compensating mechanical defocusing due to variation in temperature, the length Lb and surface S8 are chosen (for a second given material such as steel for example) as a function of length Lc and surface a×b (for a first given material such as aluminium for example) so that thermal expansion of the barrel 1 translates into deformation of the beams 7 and of the bars 8 along the longitudinal axis (AA). As a result, thermal expansion of the barrel 1 translates into displacement of the first portion 11 relative to the second portion 12 along the longitudinal axis (AA), to compensate for defocusing.

The above-mentioned choice of length Lb and surface S8 as a function of length Lc and surface a×b is made in manner known to the person skilled in the art via finite element modelling, and will not be described in the present description.

Evidently, for an optical system, the above-mentioned determination also depends on the positioning of the lenses and detector in the barrel 1.

At all events, deformation of the beams 7 occurs under conditions of elasticity of the first material, and it is therefore elastic and reversible: the barrel returns to its initial position when the temperature returns to its initial value.

It will therefore be appreciated that when the temperature of the system changes, all three bars 8 connected to the first portion 11, on account of the variation in length Lb of each bar 8, apply an identical force on the second portion 12 connected to one end of each beam 7. The variation in length Lb is different from the variation in length Lc of each beam 7 owing to the difference between the first material and the second material.

The resultant of these forces is deformation of the beams 7 and of the bars 8 along the longitudinal axis (AA) and displacement d (see FIG. 2) of the first portion 11 relative to the second portion 12 along the longitudinal axis (AA) to compensate for defocusing.

The rigidity of the first portion 11 must be sufficient to minimize local deformations to recessing of the beams 7.

The at least three bars 8 are preferably regularly distributed circumferentially around the barrel 1 relative to the longitudinal axis (AA), for reasons of symmetry.

In the same manner, the at least three beams 7 are regularly distributed circumferentially around the barrel 1 relative to the longitudinal axis (AA).

In the event that the device comprises three bars 8, these are regularly distributed relative to one another at 120° around the axis (AA). In this case also, the device comprises three beams 7 regularly distributed relative to one another at 120° around the axis (AA).

The device may also comprise four bars, regularly distributed at 90° around the axis (AA), and four beams regularly distributed at 90° around the axis (AA).

In general and as shown in FIG. 2 for example, the maximum number of beams 7 circumferentially distributed around the barrel 1 is equal to the circumferential length of the barrel 1 divided by the circumferential length of a beam: the beams 7 follow each other along the circumference of the barrel 1 and are separate from each other.

Also in general, the maximum number of bars 8 distributed circumferentially around the barrel 1 is equal to the maximum number of beams 7.

Preferably as shown in FIGS. 2 and 3, the device comprises a number of beams 7 that is equal to the number of bars 8.

The beams 7 and the bars 8 can be offset from each other or they may coincide.

In this latter case, FIGS. 2 and 3 show that each bar 8 can be arranged in a notch 13 of the barrel 1. The notch 13 lies for example in the geometric continuation of the elbow 72 of the beam 7.

FIG. 4 illustrates another embodiment in which each bar 8 is arranged between two tongues 14 of the barrel 1 and not in a notch.

The tongues 14 are preferably made in one piece on the first portion 11 and the second portion 12. Ends 81 and 82 of the bars 8 are secured to the first portion 11 and to the second portion 12 via the tongues 14 using conventional means such as screwing, crimping or bonding.

If an optical system comprises an optical detector 6, e.g. infrared, on the second portion 12, the second portion 12 defines a plane P secant to the longitudinal axis (AA) which in this case is also the optical axis.

It is then desirable to be able to adjust an angle between the plane P and the longitudinal axis (AA), also called the tilt angle by the person skilled in the art.

For this purpose, and as shown in FIGS. 5 and 6, at least one bar 8 comprises an adjustable end 82 connected to the second portion 12, the second portion 12 comprising a part 15 cooperating with the bar 8. Preferably, at least three bars 8 comprise a said adjustable end.

It will be appreciated that the part 15 may for example comprise the elbow 72 (the case in FIGS. 1 to 3 for example) or the tongue 14 (the case in FIG. 4 for example).

As shown in FIG. 5, the end 82 comprises a tapped bore 823 for cooperation with a shank 826 of a screw 824 also comprising a head 825. The shank 826 also cooperates with a lock-nut 827.

The part 15 secured to the second portion 12 is bored, the shank 826 passing through the bore of the part 15. The head 825 and the lock-nut 827 are distributed either side of the part 15. By screwing the screw 824 in the bore 823, with the head 825 abutting the part 15, it is possible to carry out adjusting of an angle between the plane P and the longitudinal axis (AA). The lock-nut 827, by abutting the part 15, allows the securing of the shank 8 with the second portion 12.

According to one variant illustrated in FIG. 6, the end 82 comprises a projecting threaded rod 820 for cooperation with two nuts 821 and 822. The part 15 secured to the second portion 12 is bored, the rod 820 passing through the bore of the part 15. The two nuts 821 and 822 are distributed either side of the cooperating part 15. Via displacement of the nut 821 on the rod 820, with the nut 821 abutting the part 15, it is possible to obtain adjustment of an angle between the plane P and the longitudinal axis (AA). The nut 821, by abutting the part 15, allows securing of the rod 8 with the second portion 12.

According to non-illustrated variants, the adjustments of the angle between plane P and the longitudinal axis (AA) can be oriented towards portion 11 instead of towards portion 12 as illustrated in FIGS. 5 and 6, for reasons related to practical integration for example.

The invention claimed is:

1. A passive mechanical athermalization device comprising:
  a barrel (1) formed of a first material having a first thermal expansion coefficient ($\lambda 1$) and having a longitudinal axis (AA) and a radial axis (BB) perpendicular to the longitudinal axis (AA), the barrel (1) comprising at least one first portion (11) and at least one second portion (12),
  at least three beams (7) formed of the first material, each of the beams (7) connecting the first portion (11) and the second portion (12), and extending circumferentially relative to the longitudinal axis (AA) in a direction (C) perpendicular to the longitudinal axis (AA) and to the radial axis (BB),
  at least three bars (8) formed of a second material having a second thermal expansion coefficient ($\lambda 2$) different from the first thermal expansion coefficient, and circumferentially distributed around the barrel (1) relative to the longitudinal axis (AA), each bar (8) connecting the first portion (11) and the second portion (12) axially relative to the longitudinal axis (AA), so that thermal expansion of the barrel (1) translates as deformation of the beams (7) and bars (8) along the longitudinal axis (AA).

2. The device according to claim 1 wherein the first portion (11) is part of a support for an optical device (10) comprising at least one lens (2, 3, 4, 5) formed of an optical material, and the second portion (12) is part of a support for an optical detector (6).

3. The device according to claim 1 wherein the first portion (11), the second portion (12) and the at least three beams (7) are in a single piece.

4. The device according to claim 1 comprising at least three bars (8) and at least three beams (7) regularly distributed circumferentially around the barrel (1) relative to the longitudinal axis (AA).

5. The device according to claim 1 wherein each bar (8) is arranged in a notch (13) of the barrel (1).

6. The device according to claim 1 wherein each bar (8) is arranged between two tongues (14) of the barrel (1).

7. The device according to claim 1 wherein the second portion (12) defines a plane (P) secant to the longitudinal axis (AA).

8. The device according to claim 7 wherein
  at least one bar (8) comprises an adjustable end (82) connected to the second portion (12),
  the second portion (12) comprises a part (15) cooperating with the bar (8), the end (82) comprising a projecting threaded rod (820) for cooperation with two nuts (821, 822) distributed either side of the cooperating part (15),
to allow adjustment of an angle between the plane (P) and the longitudinal axis (AA).

9. The device according to claim 7 wherein
  at least one bar (8) comprises an adjustable end (82) connected to the second portion (12),
  the second portion (12) comprises a part (15) cooperating with the bar (8),
the end (82) comprising a tapped bore (823) for cooperation with a shank (826) of a screw (824) also comprising a head (825),
the shank (826) also cooperating with a lock-nut (827),
the head (825) and the lock-nut (827) being distributed either side of the cooperating part (15),
to allow adjustment of an angle between the plane (P) and the longitudinal axis (AA).

10. An optical system comprising
  at least one optical device (10) comprising at least one lens (2, 3, 4, 5) formed of an optical material;
  an optical detector (6),
  a passive mechanical athermalization device comprising:
    a barrel (1) formed of a first material having a first thermal expansion coefficient ($\lambda 1$) and having a longitudinal axis (AA) and a radial axis (BB) perpendicular to the longitudinal axis (AA), the barrel (1) comprising at least one first portion (11) and at least one second portion (12),
    at least three beams (7) formed of the first material, each of the beams (7) connecting the portion (12), and extending circumferentially relative to the longitudinal axis (AA) in a direction (C) perpendicular to the longitudinal axis (AA) and to the radial axis (BB),
    at least three bars (8) formed of a second material having a second thermal expansion coefficient ($\lambda 2$) different from the first thermal expansion coefficient, and circumferentially distributed around the barrel (1) relative to the longitudinal axis (AA), each bar (8) connecting the first portion (11) and the second portion (12) axially relative to the longitudinal axis (AA), so that thermal expansion of the barrel (1) translates as deformation of the beams (7) and bars (8) along the longitudinal axis (AA).

\* \* \* \* \*

UNITED STATES PATENT AND TRADEMARK OFFICE
CERTIFICATE OF CORRECTION

PATENT NO.        : 8,829,416 B2
APPLICATION NO.   : 13/813149
DATED             : September 9, 2014
INVENTOR(S)       : Lucien Donce It is certified that error appears in the above-identified patent and that said Letters Patent is hereby corrected as shown below:

In the Claims

Column 6, Claim 10, line 59, please delete "the portion (12)" and insert --the first portion (11) and the second portion (12)--.

Signed and Sealed this
Thirty-first Day of March, 2015

Michelle K. Lee
*Director of the United States Patent and Trademark Office*